3,265,593
REMOVAL OF ACETALDEHYDE FROM ETHYLENE OXIDE BY EXTRACTIVE DISTILLATION

Donald G. Leis and Edward J. Mills, Jr., Charleston, W. Va., assignors to Union Carbide Corporation, a corporation of New York
No Drawing. Filed Oct. 8, 1962, Ser. No. 229,160
11 Claims. (Cl. 203—60)

This invention relates to the extractive distillation of ethylene oxide. It is particularly related to the extractive distillation of ethylene oxide containing acetaldehyde as impurity, whereby essentially pure ethylene oxide can be produced.

The commercial production of ethylene oxide by the direct oxidation of ethylene, or by the so-called chlorohydrin reaction is well known. The resulting ethylene oxide, however, is usually contaminated with acetaldehyde, a by-product of the foregoing reactions, which is present in concentrations ranging from about 100 p.p.m., and lower, to about 10,000 p.p.m., and higher. The presence of such concentrations of acetaldehyde renders the ethylene oxide undesirable for many commercial and laboratory applications where high purity ethylene oxide is required. Complete or substantial removal of this impurity is, therefore, extremely desirable.

One method of reducing the acetaldehyde impurity from ethylene oxide has heretofore been by ordinary distillation. However, the proximity of boiling points of acetaldehyde and ethylene oxide at atmospheric pressure necessitates the use of extremely efficient distillation equipment and large quantities of reflux, both of which result in increased operational cost. This method, therefore, is commercially unattractive. In another method the ethylene oxide-acetaldehyde mixture is contacted with a dilute solution of an inorganic acid, such as phosphoric acid or sulfuric acid, whereby ethylene oxide is hydrolyzed to ethylene glycol which is more readily separable from acetaldehyde by ordinary distillation. The ethylene glycol is then dehydrated to ethylene oxide. This method, however, is both cumbersome and expensive.

The present invention is predicated upon the discovery that certain organic compounds hereafter referred to as "extractants" can be successfully employed for the removal of acetaldehyde from ethylene oxide by the application of extractive distillation. Accordingly, this method contemplates contacting the acetaldehyde contaminated ethylene oxide with an extractant in a distillation zone, and subjecting the resulting mixture to extractive distillation, thereby removing the acetaldehyde with the extractant from the bottom of the distillation zone, and recovering ethylene oxide of substantially reduced acetaldehyde content.

The extractants which can be successfully employed in the novel process are normally liquid organic compounds composed of carbon, hydrogen and oxygen, whose boiling points are in the range of from about 65° C. to about 200° C., preferably from about 65° C. to about 120° C., said extractants being miscible with both ethylene oxide and acetaldehyde but being essentially inert to ethylene oxide at the conditions employed in the novel process. Illustrative extractants include alkanols, alkanediols, dialkyl ethers, dialkyl ketones at least one alkyl moiety of which is an isobutyl group, alkoxyalkanols, polyalkylene glycols, alkyl alkanoates, alkanoyloxy-alkanols, and the like, and mixtures thereof.

Illustrative extractants which can be employed in the novel process are ethanediol, propanediol, butanediol, methoxyethanol, ethoxyethanol, propoxyethanol, butoxyethanol, methoxypropanol, ethoxypropanol, propoxypropanol, butoxypropanol, methoxybutanol, ethoxybutanol, propoxybutanol, butoxybutanol, etc., or mixtures of these compounds.

The extractants which are preferably employed in the novel process are methanol; ethanol; 2-alkoxyethanol, the alkyl moiety of which contains 1 to 4 carbon atoms; alkyl isobutyl ketone, wherein the alkyl group contains from 1 to 4 carbon atoms; alkyl acetate, wherein the alkyl moiety contains from 1 to 8 carbon atoms; 2-acetoxyethanol, or mixtures of these compounds.

The ratio of ethylene oxide feed to the extractants can vary over a wide range depending upon the concentration of acetaldehyde in the feed, the operating temperature and pressure, the particular extractant which is employed, etc. Suitable results, however, can be obtained when this ratio is from about 0.5:1 to about 100:1, preferably from about 1:1 to about 10:1.

The extractive distillation is conveniently carried out at temperatures at which ethylene oxide is removed from the upper section of the distillation zone in the vapor state essentially free from the extractant, and whereas the extractant in said distillation zone is essentially in the liquid phase and is withdrawn from the lower section of said distillation zone. It can be appreciated that the temperature in the distillation zone can vary depending upon the operating pressure and the particular extractant which is employed. For example, when methanol is employed as the extractant at atmospheric pressure the temperature at the lower section of the distillation zone (or kettle temperature) can be from about 20° C. to about 28° C. and the overhead temperature is about 10.5° C., whereas if methyl isobutyl ketone is used as the extractant the corresponding temperatures can be from about 20° C. to about 25° C. and 10.5° C., respectively.

The pressure in the distillation zone can be subatmospheric, atmospheric, or superatmospheric. The distillation pressure can vary from about 0.5 atmosphere, or lower, to about 7 atmospheres, or higher, preferably from about one atmosphere to about 2 atmospheres.

The extractive distillation of the novel process can be carried out continuously or in batchwise fashion. The continuous operation can be carried out concurrently as well as countercurrently, though the latter method is preferable commercially. Thus, in continuous operation, the extractant is introduced at a point in the upper section of the distillation zone and allowed to flow down in said zone wherein it is contacted with the ascending feed (ethylene oxide contaminated with acetaldehyde), which feed is introduced at a point in the lower section of said distillation zone. Ethylene oxide having substantially reduced acetaldehyde content is removed overhead and the extractant-acetaldehyde mixture is withdrawn from the lower section of said zone. Approximately 90–95 volume percent of ethylene oxide can be recovered as a distillate, the remainder being withdrawn with the extractant.

The equipment employed to carry out the novel process can be of conventional design and construction. For example, ordinary distillation columns, either packed with suitable packing materials such as Raschig rings, Berl saddles, Intalox, etc., or equipped with perforated trays, bubble cap trays, etc., are well suited for effecting the extractive distillation herein.

The following examples serve to illustrate the present invention without limiting the same.

EXAMPLE 1

Ethylene oxide was fed at an average rate of 580 ml. per hour to a distillation apparatus comprising a kettle equipped with an Oldershaw column, overhead condenser, and a receiver. The column consisted of three sections, each section having 15 trays therein.

The ethylene oxide feed which contained 435 p.p.m. of acetaldehyde was introduced at the 15th tray from the kettle. The kettle was equipped with an electrically heated mantle which provided the heat necessary to carry out the extractive distillation.

After equilibrium conditions were established methanol was introduced at the 30th tray from the kettle and its rate was slowly increased to an average rate of 116 ml. per hour. The extractive distillation was then conducted at atmospheric pressure and overhead temperature of 10.5° C. (B.P. of ethylene oxide), and at a reflux ratio of 0.33:1 (reflux to distillate). The ethylene oxide was removed overhead, condensed and collected in the receiver and the extractant containing acetaldehyde was withdrawn from the kettle. Successive samples of ethylene oxide were withdrawn from the overhead receiver and analyzed for their acetaldehyde contents. Distillation was continued until the acetaldehyde concentration of the ethylene oxide remained substantially unchanged.

The volumetric ratio of ethylene oxide to methanol, the percent recovery of ethylene oxide, the concentration of acetaldehyde in the ethylene oxide (p.p.m.), and the percent removal of the acetaldehyde in this example, as well as in the examples which follow, are shown in Table 1 below.

EXAMPLE 2

The procedure of Example 1 was followed except that the average feed rate of ethylene oxide was 640 ml. per hour and the average feed rate of methanol was 108 ml. per hour.

EXAMPLE 3

The procedure of Example 1 was followed except that the average feed of ethylene oxide was 670 ml. per hour and the average feed rate of methanol was 84 ml. per hour.

EXAMPLE 4

The procedure of Example 1 was followed except that the average feed rate of ethylene oxide was 440 ml. per hour and the average feed rate of methanol was 120 ml. per hour.

EXAMPLE 5

The procedure of Example 1 was followed except that ethanol was used as the extractant. The average feed of ethylene oxide was 454 ml. per hour and the average feed rate of ethanol was 133 ml. per hour.

EXAMPLE 6

The procedure of Example 1 was followed except that methyl Cellosolve (ethylene glycol monomethyl ether) was used as the extractant. The average feed rate of ethylene oxide was 620 ml. per hour and the average rate of the extractant was 155 ml. per hour.

EXAMPLE 7

The procedure in Example 1 was followed except that butyl Cellosolve (ethylene glycol mono-n-butyl ether) was used as an extractant. The average feed rate of ethylene oxide was 625 ml. per hour and the average rate of the extractant was 120 ml. per hour.

EXAMPLE 8

The procedure in Example 1 was followed except that methyl isobutyl ketone was used as the extractant. The average feed rate of ethylene oxide was 600 ml. per hour and the average rate of the extractant was 150 ml. per hour.

EXAMPLE 9

The procedure in Example 1 was followed except that the extractant was 2-ethylhexyl acetate. The average feed rate of ethylene oxide was 600 ml. per hour and the average rate of the extractant was 140 ml. per hour.

EXAMPLE 10

The procedure in Example 1 was followed except that diisobutyl ketone was used as the extractant. The average feed rate of ethylene oxide was 600 ml. per hour and the average rate of diisobutyl ketone was 140 ml. per hour.

EXAMPLE 11

The procedure in Example 1 was followed except that Cellosolve acetate (ethylene glycol monoethyl ether monoacetate ester) was used as the extractant. The average feed rate of ethylene oxide was 600 ml. per hour and the average rate of the extractant was 150 ml. per hour.

EXAMPLE 12

The procedure in Example 1 was followed except that the ethylene oxide feed contained 88 p.p.m. of acetaldehyde. The average feed rate of ethylene oxide was 640 ml. per hour and the average rate of methanol (extractant) was 160 ml. per hour. The ethylene oxide distillate contained 12 p.p.m. of acetaldehyde and 0.7 percent by weight of methanol, respectively.

*Table 1*

| Example | Extractant | Acetaldehyde in Feed, p.p.m. | Volume Ratio, Ethylene Oxide to Extractant | Distillate Recovery, Vol. Percent Feed | Reduction in Acetaldehyde Content, Percent |
|---|---|---|---|---|---|
| 1 | Methanol | 435 | 5:1 | 89.4 | 92 |
| 2 | do | 435 | 5.9:1 | 88.0 | 85 |
| 3 | do | 435 | 8.0:1 | 88.6 | 78 |
| 4 | do | 435 | 3.7:1 | 89.2 | 91 |
| 5 | Ethanol | 435 | 3.4:1 | 86.8 | 78 |
| 6 | Methyl Cellosolve | 435 | 4.1:1 | 90.9 | 74 |
| 7 | Butyl Cellosolve | 435 | 5.2:1 | 90.0 | 63 |
| 8 | Methyl Isobutyl Ketone | 435 | 4.0:1 | 89.8 | 63 |
| 9 | 2-Ethylhexyl Acetate | 435 | 4.3:1 | 90.0 | 62 |
| 10 | Diisobutyl Ketone | 435 | 4.3:1 | 80.0 | 62 |
| 11 | Cellosolve Acetate | 435 | 4.3:1 | 90.7 | 60 |
| 12 | Methanol | 88 | 3.75:1 | 90.0 | 86 |

It will be observed from Table 1 that a variety of extractants can be employed to effect substantial removal of acetaldehyde from ethylene oxide by the novel process. It is further observed that there is a preferable range of ratio of ethylene oxide to extractant, beyond which no significant reduction of acetaldehyde in ethylene oxide (see Examples 1–4) was observed.

What is claimed is:

1. A process for effecting the removal of acetaldehyde from ethylene oxide which comprises contacting acetaldehyde-contaminated ethylene oxide with an extractant which is normally liquid organic compound under the extractive distillation conditions, said extractant (a) being composed of carbon, hydrogen and oxygen atoms, (b) being miscible with acetaldehyde and ethylene oxide but being essentially inert to ethylene oxide at said extractive distillation conditions, and (c) having a boiling point within the range of from about 65° C. to about 200° C. at atmospheric pressure, subjecting the resulting mixture to extractive distillation in a distillation zone under operating conditions whereby ethylene oxide having substantially reduced acetaldehyde content is removed from the upper section of said distillation zone in the vapor state essentially free from the extractant.

2. The process of claim 1 wherein the ratio of said ethylene oxide feed to said organic compound is from about 0.5:1 to about 100:1.

3. The process of claim 1 wherein the ratio of said ethylene oxide feed to said organic compound is from about 1:1 to about 10:1.

4. A process which comprises continuously and countercurrently contacting, in a distillation zone, acetaldehyde-contaminated ethylene oxide with an extractant which is a normally liquid organic compound, said extractant (a) being composed of carbon, hydrogen and oxygen atoms, (b) being miscible with acetaldehyde and ethylene oxide but being essentially inert to ethylene oxide at said distillation zone, and (c) having a boiling point in the range of from about 65° C. to about 200° C. at atmospheric pressure, subjecting the resulting mixture to extractive distillation under operating conditions whereby ethylene oxide having substantially reduced acetaldehyde content is removed from the upper section of said distillation zone in the vapor state essentially free from the extractant and whereas liquid extractant containing acetaldehyde is removed from the lower section of said distillation zone.

5. The process of claim 4 wherein said organic compound is an alkanol.

6. The process of claim 5 wherein said alkanol is methanol.

7. The process of claim 4 wherein said organic compound is an alkanediol.

8. The process of claim 4 wherein said organic compound is an alkylisobutyl ketone in which the alkyl moiety contains 1 to 4 carbon atoms.

9. The process of claim 4 wherein said organic compound is 2-alkoxyethanol in which the alkyl moiety contains 1 to 4 carbon atoms.

10. The process of claim 4 wherein said organic compound is an alkyl acetate, the alkyl moiety of which contains 1 to 8 carbon atoms.

11. The process of claim 4 wherein said organic compound is 2-alkoxyethanol acetate.

References Cited by the Examiner
UNITED STATES PATENTS

| | | | |
|---|---|---|---|
| 2,514,966 | 7/1950 | Pierotti et al. | 260—604 |
| 2,615,901 | 10/1952 | McClellan | 260—348 |
| 2,697,104 | 12/1954 | Lowe et al. | 260—348 |
| 2,775,510 | 12/1956 | Gardner et al. | 260—348 |
| 2,810,760 | 10/1957 | Gabbett | 260—601 |
| 2,870,866 | 1/1959 | Baecklund | 260—601 |
| 2,887,498 | 5/1959 | Hearne | 203—8 |

NORMAN YUDKOFF, *Primary Examiner.*

W. L. BASCOMB, *Assistant Examiner.*